(12) United States Patent
Yoon

(10) Patent No.: US 7,550,229 B2
(45) Date of Patent: Jun. 23, 2009

(54) SECONDARY BATTERY HAVING LEAD PLATE ATTACHED THERETO

(75) Inventor: Heui Sang Yoon, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 826 days.

(21) Appl. No.: 11/095,131

(22) Filed: Mar. 30, 2005

(65) Prior Publication Data

US 2005/0221174 A1    Oct. 6, 2005

(30) Foreign Application Priority Data

Mar. 30, 2004    (KR) ...................... 10-2004-0021428

(51) Int. Cl.
*H01M 2/08*    (2006.01)
(52) U.S. Cl. ...................... 429/180; 429/181; 29/623.4
(58) Field of Classification Search ............... 429/175, 429/178, 180, 181; 29/623.4
See application file for complete search history.

(56) References Cited

U.S. PATENT DOCUMENTS

| 5,474,859 | A * | 12/1995 | Takeuchi et al. ......... 429/181 X |
| 7,241,529 | B2 * | 7/2007 | Cho ........................ 429/178 X |
| 2005/0221176 | A1 * | 10/2005 | Kim ............................ 429/175 |
| 2006/0003192 | A1 * | 1/2006 | Lim ........................ 429/178 X |
| 2006/0024573 | A1 * | 2/2006 | Yim et al. ................ 429/181 X |
| 2007/0190411 | A1 * | 8/2007 | Uh .......................... 29/623.4 X |

FOREIGN PATENT DOCUMENTS

JP    11-111246    *    4/1999

* cited by examiner

*Primary Examiner*—Stephen J. Kalafut
(74) *Attorney, Agent, or Firm*—Christie, Parker & Hale, LLP

(57) ABSTRACT

A secondary battery comprises a bare cell including an electrode assembly composed of positive and negative electrodes and a separator, a can acting as a container for containing the electrode assembly and an electrolyte, and a cap assembly having a cap plate for covering the open upper end of the can and a lead plate coupled to a part of the cap plate, wherein an electrolyte injection hole is positioned on a side of the cap plate. The lead plate has a bottom portion which covers the electrolyte injection hole and at least a part of which is coupled to a surface of the cap plate. Additionally, a part of the lead plate, which corresponds to the electrolyte injection hole of the bottom portion, is removed to form a hole so that a cap which seals the electrolyte injection hole is exposed.

14 Claims, 4 Drawing Sheets

SECONDARY BATTERY HAVING LEAD PLATE ATTACHED THERETO

CROSS-REFERENCE TO RELATED APPLICATION(S)

This application claims priority to and the benefit of Korean Patent Application number 2004-21428, filed Mar. 30, 2004, the entire disclosure of which is incorporated herein by reference.

BACKGROUND OF THE INVENTION

1. Field of the Invention

The present invention relates to a secondary battery, and more particularly to a secondary battery having a lead plate attached thereto.

2. Description of the Prior Art

Recently, secondary batteries have been developed and used extensively because they are rechargeable and have the potential to be compact, yet have a large capacity. Typical examples of secondary batteries include nickel-metal hydride (Ni-MH) batteries, lithium (Li) batteries, and lithium ion batteries.

In most cases, the bare cell of secondary batteries is formed by placing an electrode assembly, composed of positive and negative electrodes and a separator, into a can which is made of iron, aluminum, or aluminum alloy, covering the can with a cap assembly, injecting an electrolyte into the can, and sealing the cap assembly. If the can is made of aluminum or an aluminum alloy, the weight of the batteries may be advantageously reduced because aluminum is lightweight. In addition, the batteries do not become corroded even when they are used for a long time under high voltage.

In general, the bare cell of secondary batteries is provided with an electrode terminal on its upper portion. The electrode terminal is insulated from its surroundings and is connected to an electrode inside the bare cell to form the positive or negative terminal of the battery. The can itself has a polarity opposite to that of the electrode terminal.

The electrode terminal of a sealed bare cell of a secondary battery is electrically connected to a terminal of a safety apparatus, such as a positive temperature coefficient (PTC) device or a protective circuit module (PCM). The safety apparatus is connected to positive and negative terminals and prevents any danger, such as fracture of the battery, by interrupting the current when the temperature of the battery rises drastically or the voltage increases abruptly due to, for example, overcharging or over-discharging.

Generally, it is difficult to electrically connect the electrodes of the bare cell to the electric terminals of, for example, a PCM, by direct welding because of the shape and the material of the bare cell. Accordingly, a conductor structure, called a "lead plate," is used to connect the positive and negative electrodes of the battery to the electric terminals of a safety apparatus, e.g., a PCM. The lead plate is usually made of nickel, a nickel alloy, or nickel-plated stainless steel. The safety apparatus and the bare cell are placed into a separate pack where they are electrically connected to each other. Alternatively, a melt resin may be used to fill and coat the space between the safety apparatus and the bare cell to complete the battery pack.

However, a problem may occur when trying to weld a lead plate made of nickel to a can made of aluminum. Because of the high melting points of nickel and aluminum, and the excellent conductivity of aluminum, it is very difficult to successfully use ultra-sonic welding or resistance welding on these materials. Therefore, a laser is generally used to weld the can to the lead plate. If such laser welding is performed while the lead plate is connected to a protective circuit, the irradiating laser beams may result in potential electric shock or present other safety hazards. According to a conventional method, the lead plate is first welded to a can-type battery, and then the terminal plate of the protective circuit side is welded to the lead plate by resistance welding.

Further, when the lead plate is directly welded to the can, and specifically, to the bottom surface of the can, by laser welding, the electrolyte may leak from the welded portion if the welding strength is not correctly controlled. This is because the can has a thickness of about 0.2 to 0.3 mm, according to the typical method of making batteries in a flat shape with reduced weight. Therefore, the lead plate is, in many cases, formed on a part of the cap assembly of the can-type battery, usually on the cap plate.

When the lead plate is connected to the cap plate, the bare cell and the PCM are, in many cases, retained in a mold for a molding resin while they are connected to each other by the lead plate welding, and the gap is filled with molding resin to complete a resin molding type secondary battery. Such a resin molding type secondary battery is advantageous in that it has a smooth appearance as compared to the case where a separate case for a hard pack is used.

FIG. 1 shows a schematic lateral sectional view of the upper portion of a bare cell illustrating the problem occurring when a lead plate is welded to a side of a cap plate of a secondary battery according to the prior art. An electrode assembly 12, which is formed by laminating and winding negative and positive electrodes 15 and 13 and a separator 14, is inserted into a can 11, and a cap assembly is coupled to the open upper portion of the can. The cap assembly has a cap plate 110 as a main body and a negative terminal 130 formed in the central hole 113 of the cap plate 110 via an insulating gasket 120. The cap plate 110 has an electrolyte injection hole 112 formed on a side thereof adjacent the negative terminal 130. The cap plate 110 may also have a safety vent (not shown) positioned on the other side of the negative terminal 130. The electrolyte injection hole allows an electrolyte to be injected into the can 11 after the can has been covered with the cap assembly. After the electrolyte has been injected, the electrolyte injection hole 112 is sealed by a plug 160, which is formed by press-fitting an aluminum ball into the electrolyte injection hole.

However, in a conventional resin molding type secondary battery wherein the plug 160 is formed by press-fitting an aluminum ball into the electrolyte injection hole formed on the cap plate, a minute gap is likely to exist between the electrolyte injection hole 112 and the plug 160. As a result, laser welding is performed between the plug and the cap plate around the plug in order to prevent the electrolyte from leaking through the gap. It is also possible to prevent the leakage of the electrolyte by a two-step process of applying a liquid resin (or resin droplets) to the plug 160 and curing it by light or heat to form a resin plugging member 250.

The resin plugging member 250 or the plug 160 inevitably protrude out of a surface of the cap plate as a result of the method of forming them. A lead plate 210 has a bottom portion 211 having a predetermined area for surface-to-surface coupling with the cap plate 110 of the bare cell and a wall portion 213 protruding vertically toward the PCM from the bottom portion 211 for coupling with the electric terminal of the PCM. At least a part of the lead plate 210 is superimposed on the electrolyte injection hole 112. When welding is performed to couple the bottom portion 211 of the lead plate to the cap plate 110, the plug 160 or the resin plugging member 250, which protrudes out of the electrolyte injection hole 112, causes the bottom portion 211 of the lead plate to float on the cap plate 110, as shown schematically in FIG. 1. This protrusion interferes with the welding and may cause the weld to be weakened.

The lead plate 210 acts as a conducting path for connecting the cap plate, which is the positive terminal of the bare cell, to the connection terminal of the PCM. The lead plate 210 is inserted into the molding resin portion, which couples the PCM and the bare cell to each other in the resin molding type secondary battery, to firmly retain the bare cell. If welding fails to be correctly performed between the lead plate and the cap plate, the lead plate cannot accomplish the above functions. As a result, the mechanical strength or the electric connection of a finished secondary battery deteriorates. Therefore, there is a need for a secondary battery that addresses the above-described problems.

SUMMARY OF THE INVENTION

A secondary battery is provided having a lead plate attached thereto wherein the bottom portion of the lead plate may be easily welded to a surface of a cap plate for reliable coupling strength between them.

The secondary battery may further include a cap plate designed such that any floating between the lead plate and the cap plate is prevented.

Accordingly, a secondary battery of an exemplary embodiment of the present invention includes a bare cell having an electrode assembly composed of positive and negative electrodes and a separator, and a can acting as a container for containing the electrode assembly and an electrolyte. The battery may also include a cap assembly having a cap plate for covering the open upper end of the can and a lead plate coupled to a part of the cap plate, wherein an electrolyte injection hole is positioned on a side of the cap plate. Additionally, the lead plate has a bottom portion which covers the electrolyte injection hole and the lead plate is coupled to a surface of the cap plate. Further, a part of the lead plate which corresponds to the electrolyte injection hole of the bottom portion is removed to form a hole so that a plug which seals the electrolyte injection hole is exposed.

The lead plate may be formed only from a bottom portion having the shape of a flat plate, but generally also includes has a wall portion protruding upward from the bottom portion to be coupled with an electrode tap of a PCM.

DETAILED DESCRIPTION

Figure 1:
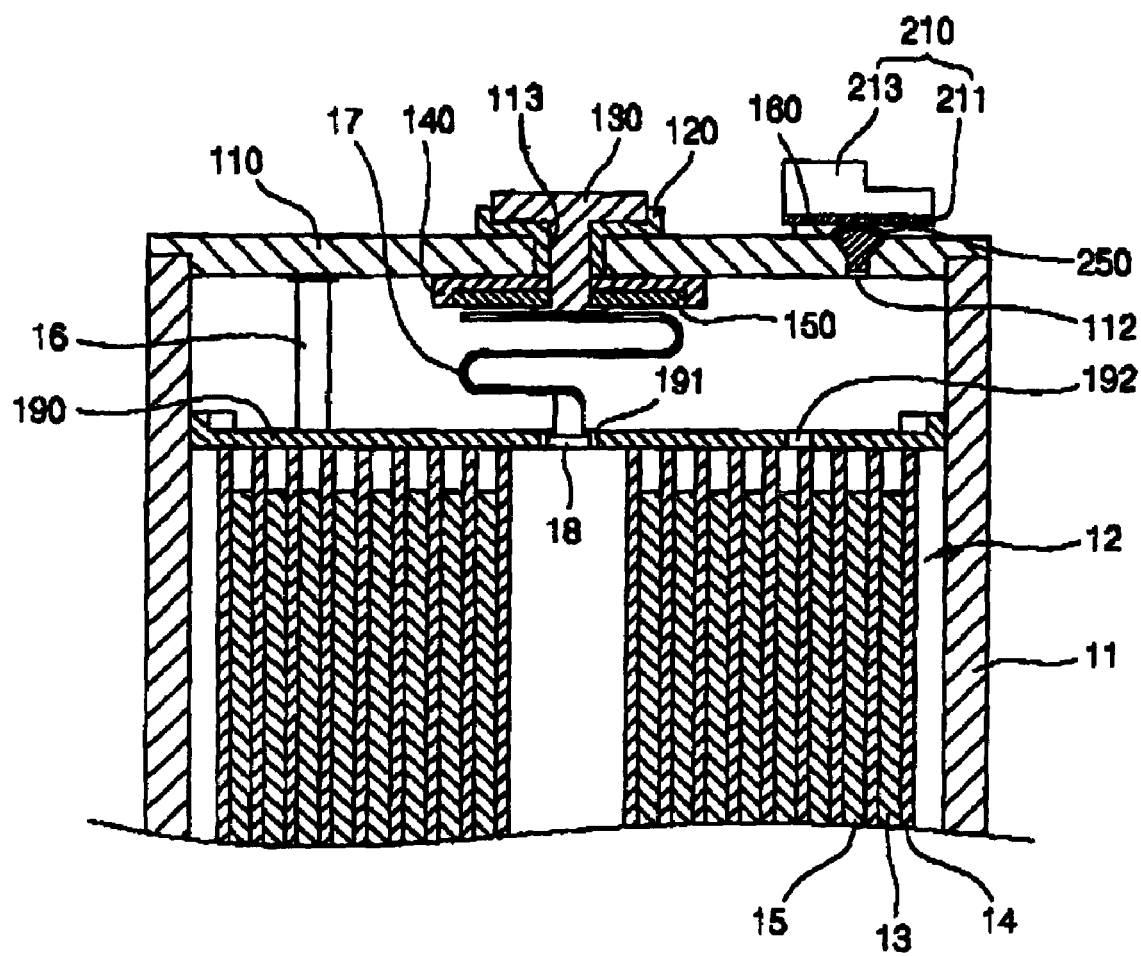
FIG. 1 is a schematic lateral sectional view of an upper portion of a bare cell for illustrating the problem occurring when a lead plate is coupled by welding to a side of a cap plate of a bare cell of a secondary battery according to the prior art.

Hereinafter, exemplary embodiments of the present invention will be described with reference to the accompanying drawings. In the following description and drawings, the same reference numerals are used to designate the same or similar components.

Figure 2:
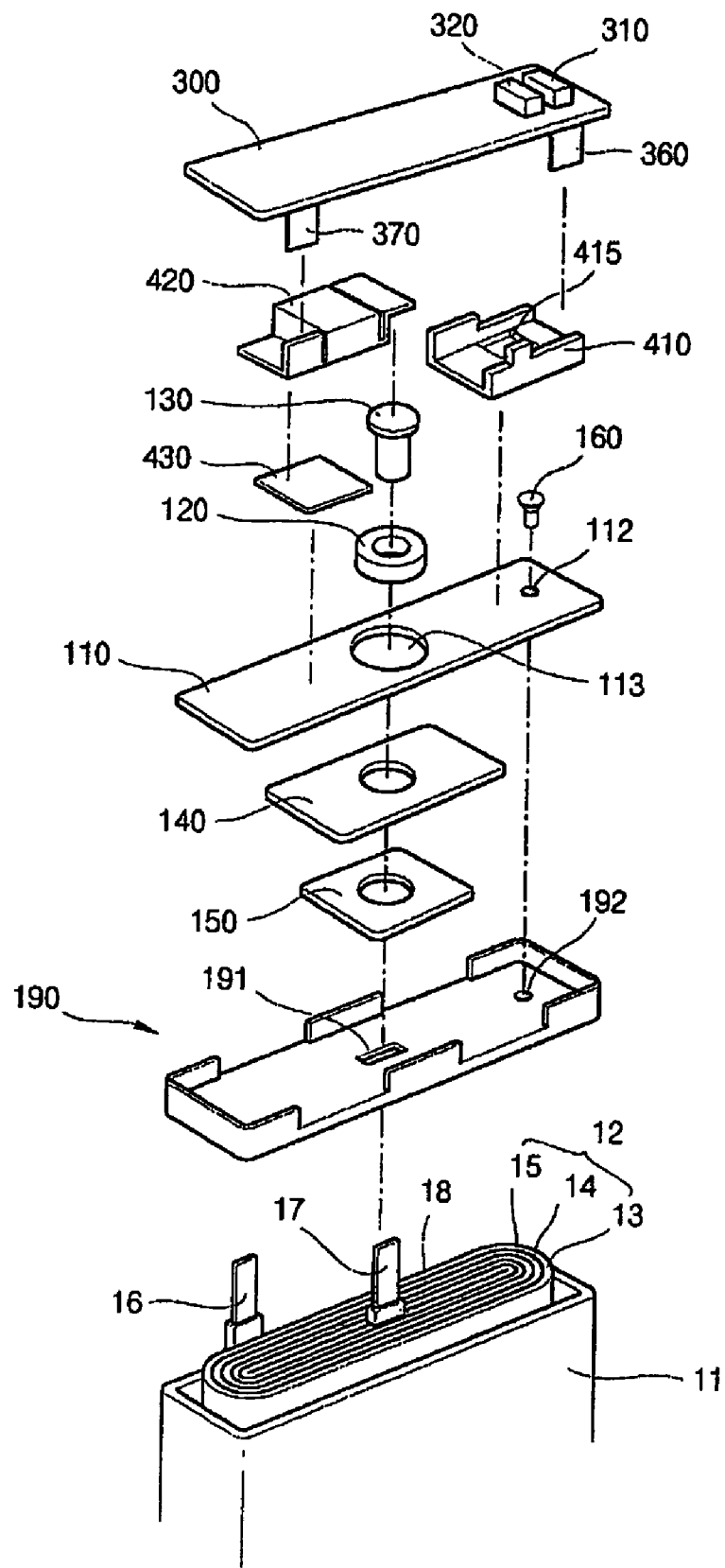
FIG. 2 is an exploded perspective view showing a secondary battery according to an embodiment of the present invention in a state wherein a PCM and a bare cell are coupled to each other, prior to where they are coupled by a molding resin.

Referring now to FIG. 2, a lithium pack battery has a bare cell which includes a can 11, a electrode assembly 12 contained in the can 11, and a cap assembly coupled to the open upper end of the can 11 for sealing it.

The electrode assembly 12 is formed by winding a positive electrode 13, a separator 14, and a negative electrode 15, which are formed in a thin plate shape, a film shape or an eddy shape. Insulating tape 18 is wound about respective boundary portions wherein positive and negative leads 16 and 17 are led out of the electrode assembly 12 in order to prevent a short circuit between the two electrodes 13 and 15. The can 11 is generally made of aluminum or an aluminum alloy having the shape of a cuboid. The can 11 contains the electrode assembly 12 through the open upper end thereof and acts as a container for the electrode assembly 12 and an electrolyte. The cap assembly has a cap plate 110 which plays the role of the positive terminal of the bare cell.

The cap assembly has a flat plate-shaped cap plate 110, which has a size and a shape corresponding to the open upper end of the can 11, and a terminal through-hole formed in the central portion thereof, so that an electrode terminal (negative terminal 130) can pass through. A tube-shaped gasket 120 is positioned on the outer portion of the negative terminal 130 to provide electric insulation between the negative terminal 130 and the cap plate 110. An insulating plate 140 is placed on the lower surface of the cap plate 110. The insulating plate 140 has a terminal plate 150 positioned on the lower surface thereof for connection with the negative terminal. The cap plate 110 has a positive lead 16 welded to the lower surface thereof, and the negative terminal 130 has a negative lead 17 welded to the lower end thereof.

Further, an insulating case 190 may be positioned in such a manner that it covers the upper end of the electrode assembly 12. The insulating case has a lead through-hole 191 and an electrolyte through-hole 192 formed thereon. The cap plate 110 may have an electrolyte injection hole 112 formed on a side thereof about the negative terminal and a safety vent (not shown) formed on the other side thereof. The electrolyte injection hole 112 is provided with a plug 160 in order to seal it after an electrolyte is injected. A resin plugging member (not shown) is placed above the plug 160. The peripheral portion of the cap plate 110 is coupled to the upper end of the lateral wall of the can 11 by welding.

The PCM 300 has a circuit portion and connection terminals 360, 370 positioned on the inner surface thereof, which is opposite to the surface having external terminals 310, 320 formed thereon. The connection terminals 360, 370 may be coupled to lead plates 410, 420, which are coupled to the bare cell by resistance spot welding. The lead plate 420, which is positioned between the PCM 300 and the negative terminal 130, may have a breaker or the like coupled thereto, An insulating plate 430 made of, e.g., a double-faced tape, is used to insulate the lead plate 420, which is connected to the negative terminal 130, from the cap plate 110. If the cap plate 110 is provided with a safety vent, the insulating plate 430 can couple the lead plate 420 thereto while protecting the safety vent. The lead plate 410, which is positioned above the plug 160, is coupled to a surface of the cap plate 110 at the lower surface of the bottom portion of the lead plate. The bottom portion of the lead plate 410, which is generally coupled to the cap plate 110, has a generally rectangular shape and is provided with a wall portion 413 on at least a part of the peripheral edge thereof, which protrudes vertically relative to the surface of the cap plate. However, a part of the bottom portion of the lead plate 410 may be removed in a region corresponding to the electrolyte injection hole 112, such as in the region of the plug 160 or the resin plugging member, to form a hole.

Figure 3:
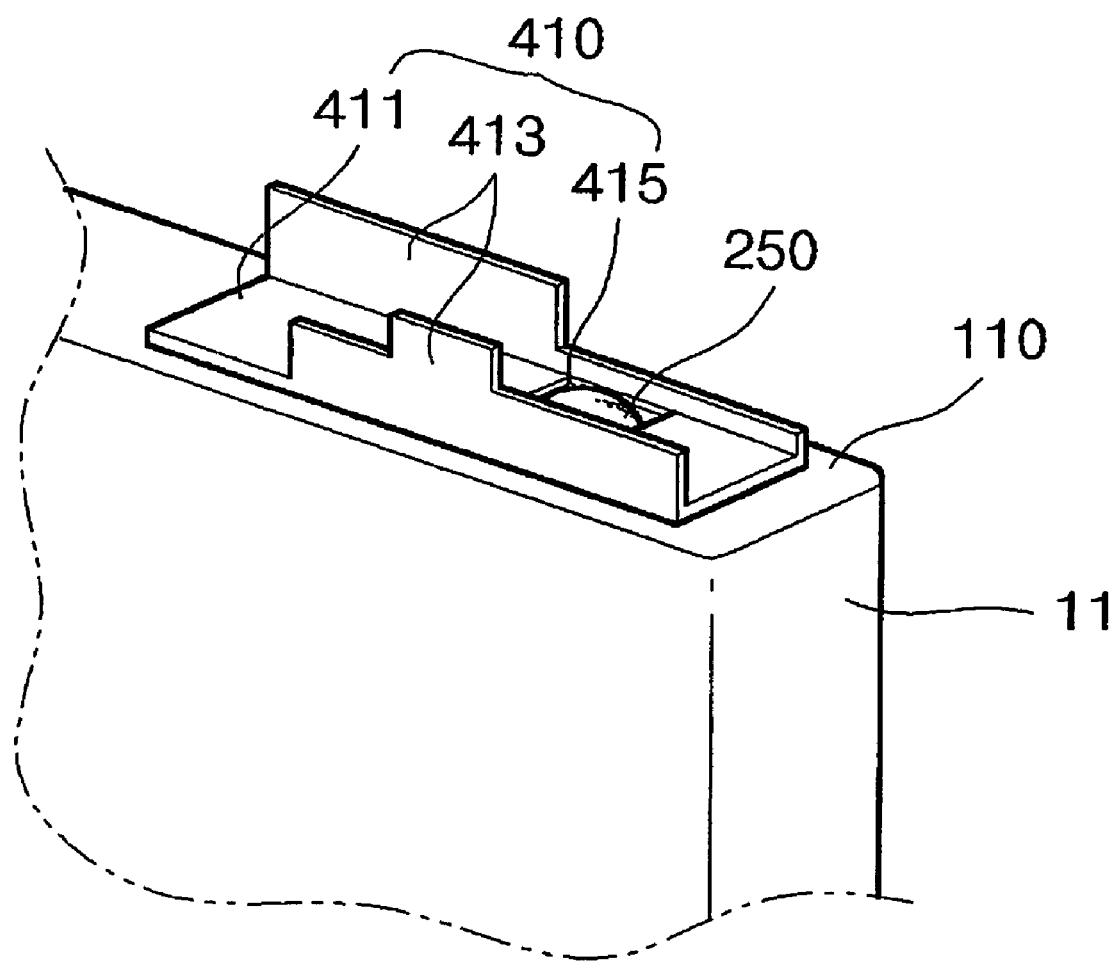
FIG. 3 is a partial perspective view showing a bare cell and a lead plate coupled to each other according to an embodiment of the present invention.
Figure 4:
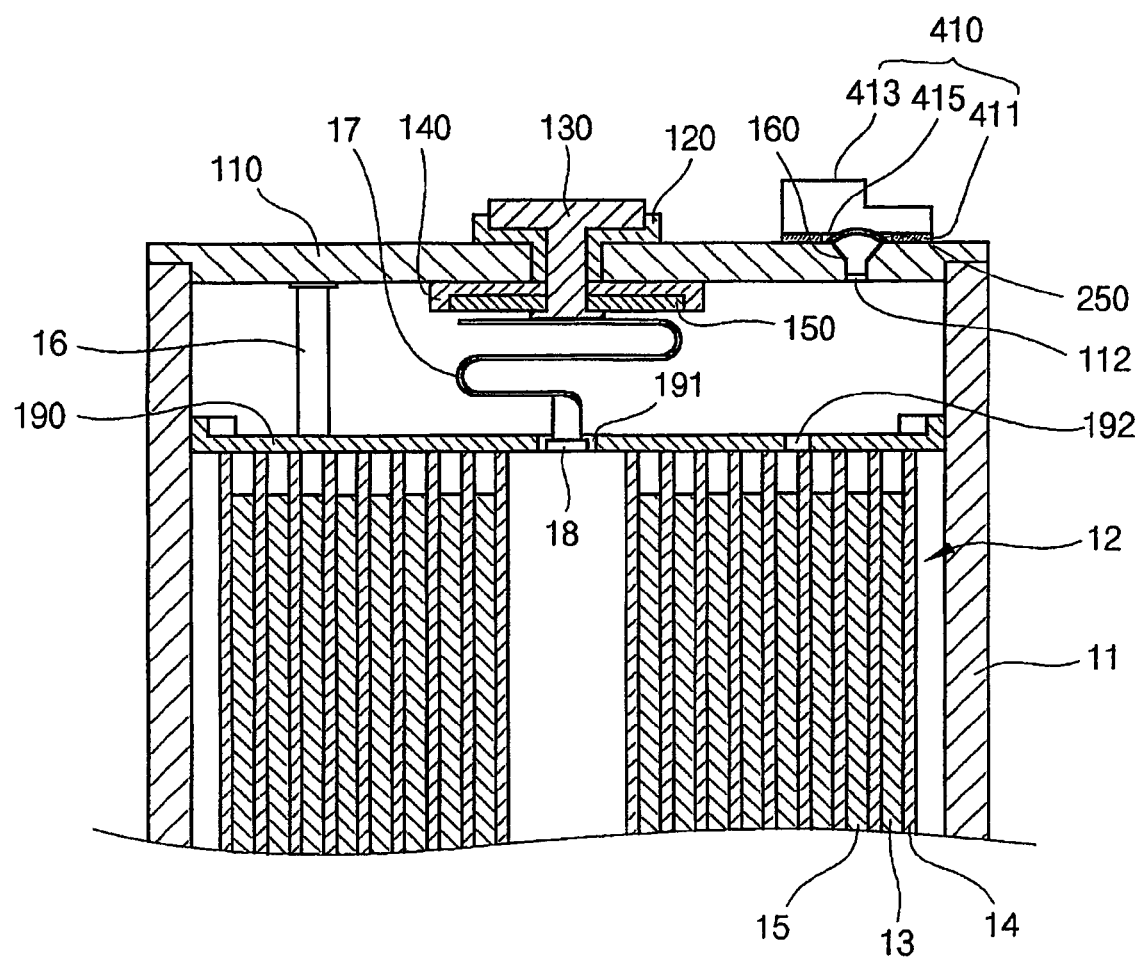
FIG. 4 is a front sectional view showing a secondary battery according to an embodiment of the present invention, wherein a bare cell and a lead plate are coupled to each other.

Referring to FIGS. 3 and 4, a part of the bottom portion of the lead plate is removed to form a hole 415. Through the space defined by the hole 415, a part of the electrolyte injection hole 112 of the cap plate 110 is exposed to the exterior. The plug 160 or the resin plugging member 250, which protrudes more or less upward from a surface of the cap plate when sealing the electrolyte injection hole, is also exposed through the hole.

Therefore, in contrast to the prior art, the bottom portion 411 of the lead plate 410 may be fastened to the surface of the cap plate, except for the part where the hole 415 is formed. This improves the welding reliability between the lead plate and the cap plate and stabilizes the mechanical and electric connection of the lead plate to the bare cell.

The hole 415 may have various shapes, including a square or a circle, but preferably has a size and a shape corresponding to the conventional shape of the plug 160 or the resin plugging member 250 which protrudes from the cap plate 110. If the size of the hole is too large, the area of the bottom portion 411 of the lead plate which is in contact with the cap plate is reduced. This may make welding difficult and degrade the welding strength.

The hole may be formed by various methods, including punching. For example, when the lead plate is cut into a shape, the hole may be formed by punching at the same time. The lead plate is then bent to form the bottom portion 411 and the wall portion 413. Alternatively, the lead plate may be formed by filling a part of a mold, on which the hole is to be formed, beforehand and pouring a melted metal material into the mold to cast the lead plate.

The lead plate is conventionally made of nickel or a nickel alloy material. The bottom of the lead plate can be welded to the cap plate by laser welding in various shapes, except for the part where the hole is formed. During laser welding of the lead plate, the welding depth is generally between about 0.15 to about 0.4 mm, in consideration of the thickness of the lead plate and the cap plate, as well as necessary welding strength.

The thickness of the lead plate in one embodiment is between about 0.05 to about 0.45 mm and is determined with regard to the thickness of the can and welding convenience. In the case of a pack battery, which is formed by filling the space between a battery can sealed by a cap assembly and a PCM, a thick lead plate may act advantageously act as a support when the battery is subjected to twisting or bending forces and increases the degree of resistance against external forces.

The welding may be performed by various methods. For example, spot welding may be evenly distributed on the bottom portion, but line welding may be used to increase the weld strength. Line welding may be performed by various methods according to the size and the shape of the bottom portion of the lead plate, including forming a closed loop such as a circle, or forming at least one line such as a straight line, an L-shaped line, or a U-shaped line.

In one embodiment, line welding may be performed along the periphery of the bottom portion of the lead plate. This is advantageous for adjusting the welding strength and reducing faults compared to welding performed from above the bottom portion, because the welding is performed directly at the contact portion between the lead plate and the cap plate.

A PCM, which has a protective circuit mounted thereon to prevent the overcharge and over-discharge of the battery, and other battery subsidiaries may then be connected to the battery, which has the lead plate welded thereto. The lead plate acts as the positive electrode and the electrode terminal acts as the negative electrode. The structure and the polarity of the electrodes may vary. According to the type and the shape of the PCM and the battery subsidiaries, the battery, to which the components are coupled may be put into a separate sheath body. Alternatively, the battery may be molded into a pack battery by filling the space between the PCM and the cap plate with a low-temperature molding resin in a hot melt process, or by applying an overall resin coating.

As mentioned above, according to embodiments of the present invention, it is possible to secure enough strength of the welding portion between the lead plate and the cap assembly to prevent the lead plate from being separated from the cap assembly easily when the battery pack is subject to an external force or during processes taking place after the lead plate is welded. The electric connection may also be made in a stable manner.

In addition, it is possible to properly adjust the laser output necessary for welding, because stable welding may be performed while the lead plate is fastened to the cap plate.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A secondary battery comprising:
    a bare cell including:
        an electrode assembly having a positive electrode and a negative electrode and a separator;
        a can for containing the electrode assembly and an electrolyte, the can having an open upper end; and
        a cap assembly having a cap plate for covering the open upper end of the can, the cap plate having an electrolyte injection hole; and
    a lead plate having a bottom portion coupled to a surface of the cap plate, the lead plate having an opening corresponding to a shape of the electrolyte injection hole and exposing a plug which seals the electrolyte injection hole.

2. The secondary battery as in claim 1, wherein the lead plate has a wall portion protruding from the bottom portion for coupling with other electronic components.

3. The secondary battery as in claim 1, wherein a plug covered by a resin plugging member is in the electrolyte injection hole, the electrolyte injection hole being adapted to receive the plug.

4. The secondary battery as claimed in claim 1, wherein the bottom portion of the lead plate is line-welded at a peripheral portion and is coupled to the cap plate.

5. The secondary battery as in claim 4, wherein the line-welded portion is a closed loop.

6. The secondary battery as in claim 4 wherein the line-welded portion is a line.

7. The secondary battery as claimed in claim 1, wherein the opening of the lead plate is a punched hole.

8. The secondary battery as in claim 1, wherein the can has a generally rectangular cross-section.

9. A method of connecting a cap plate of a secondary battery to a connection terminal of a protective circuit module, the cap plate having an injection hole filled by a plug, the method comprising:
    forming a lead plate having a bottom portion with an opening corresponding to the injection hole;

positioning the lead plate over the injection hole such that the opening exposes the plug; and welding the lead plate to the cap plate.

10. The method according to claim 9, further comprising forming the opening by punching.

11. The method according to claim 9, wherein the welding is laser welding.

12. The method according to claim 9, wherein the welding is line welding.

13. The method according to claim 9, further comprising forming the lead plate with a wall portion protruding from the bottom portion.

14. The method according to claim 9, wherein the secondary battery is formed to have a generally rectangular cross-section.

\* \* \* \* \*